(12) United States Patent
Fuller et al.

(10) Patent No.: US 7,855,168 B2
(45) Date of Patent: Dec. 21, 2010

(54) METHOD AND COMPOSITION FOR REMOVING FILTER CAKE

(75) Inventors: Michael J. Fuller, Houston, TX (US); Syed Ali, Sugar Land, TX (US); Laurent Pirolli, St. Ives (GB); John W. Still, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 138 days.

(21) Appl. No.: 12/339,921

(22) Filed: Dec. 19, 2008

(65) Prior Publication Data

US 2010/0160189 A1 Jun. 24, 2010

(51) Int. Cl.
*C09K 8/04* (2006.01)
*C09K 8/32* (2006.01)
*E21B 7/00* (2006.01)

(52) U.S. Cl. .................. 507/145; 166/276; 166/278; 166/305.1; 166/376; 175/64; 175/65; 507/117; 507/203; 507/268; 507/277

(58) Field of Classification Search ............ 507/145, 507/117, 203, 268, 277; 166/276, 278, 305.1, 166/376; 175/64, 65
See application file for complete search history.

(56) References Cited

U.S. PATENT DOCUMENTS

| | | | |
|---|---|---|---|
| 5,981,447 A * | 11/1999 | Chang et al. | 507/271 |
| 6,978,838 B2 | 12/2005 | Parlar et al. | |
| 7,134,496 B2 | 11/2006 | Jones et al. | |
| 7,666,821 B2 * | 2/2010 | Fu | 507/244 |
| 2004/0063587 A1 * | 4/2004 | Horton et al. | 507/100 |
| 2004/0106525 A1 * | 6/2004 | Willberg et al. | 507/200 |
| 2008/0039347 A1 * | 2/2008 | Welton et al. | 507/213 |
| 2010/0152069 A1 * | 6/2010 | Harris | 507/201 |

OTHER PUBLICATIONS

SPE 107341—Lavoix, F., Leschi, P. Aubry, E., Quintero, L., Le Prat, X., Jones, T.—Airst Application of Novel Microemulsion Technology for Sand Control Remediation Operations—A Successful Case Histroy from the Rosa Field, a Deepwater Development Project in Angola. Copyright 2007, Society of Petroleum Engineers.
SPE 107499—Quintero, L., Jones, T.A., Clark, D.E., Twynam, A.—NAF Filtercake Removal Using Microemulsion Technology. Copyright 2007, Society of Petroleum Engineers.

* cited by examiner

*Primary Examiner*—Timothy J. Kugel
(74) *Attorney, Agent, or Firm*—Martin Rzaniak; David Cate; Robin Nava

(57) ABSTRACT

The current disclosure describes a multifunctional fluid that addresses a new concept in the removal of filter cake. A composition is disclosed comprising: a carrier fluid, a surfactant, a fluorine source and an organic stabilizer able to minimize precipitation of fluorine The associated method to remove the filter cake is also described.

10 Claims, 2 Drawing Sheets

| Sample | Fluid | Temperature (degC) | Core Length (cm) | Q (mL/min) | k(ini) - production direction (mD) | DP (ini) - production kPa (psi) | DP(max) kPa (psi) | D(DP) kPa (psi) | [Al]-peak (ppm) | [Ca]-peak (ppm) | Shut In (after treatment phase) (hours) | k(fin)-production direction (mD) |
|---|---|---|---|---|---|---|---|---|---|---|---|---|
| A3 | 9% HCl + 2% HF + 10% Maleic Acid + 10% NH4-HEDTA (blend) | 60 | 15.2 | 5 | 302.2 | 41.5 (6.02) | 119.9 (17.4) | 64.7 (9.38) | 2600 | 7460 | 0 | 430 |
| B3 | 9% HCl + 2% HF + 10% Maleic Acid + 10% NH4-HEDTA (blend) + 1% BET O-30 | 60 | 15.2 | 5 | 282.2 | 43.8 (6.35) | 439.2 (63.7) | 395.4 (57.35) | 2610 | 7700 | 0 | 288.4 |
| C3 | 5% HCl + 1% HF + 7% Maleic Acid + 0.5% boric acid + 1% BET O-30 | 80 | 15.4 | 5 | 23.53 | 419.9 (60.9) | 2389.1 (345.5) | 1962.2 (284.6) | 6300 | 8350 | 3 | 21.9 |

Figure 2 - Table 3

METHOD AND COMPOSITION FOR REMOVING FILTER CAKE

BACKGROUND

This invention relates generally to the art of drilling fluids used in oilfield application. More particularly it relates to dissolution of filtercakes made by drilling fluids and methods to dissolve filtercakes in a well from which oil and/or gas can be produced. Most particularly it relates to a multifunction fluid for the efficient dissolution of filtercakes.

The statements in this section merely provide background information related to the present disclosure and may not constitute prior art.

In order to produce hydrocarbon fluids from subterranean formations, a borehole is drilled from the surface down into the desired formations. During the drilling step, reservoir drilling fluid (RDF) is circulated within the drilling equipment first, to cool down and clean the drill bit, secondly, to remove the drill cuttings out of the wellbore, thirdly, to reduce friction between the drilling string and the sides of the borehole, and fourthly to form a filtercake in order to prevent fluid leak off into the formation. The driving force for the formation of the filtercake is the higher wellbore pressure applied to maintain the borehole stability. This filtercake restricts the inflow of reservoir fluids into the well during the drilling process and placement of the completion. If the filtercake damage that is created during the drilling process is not removed prior to or during completion of the well, a range of issues can arise when the well is put on production (i.e. completion equipment failures and impaired reservoir productivity). The solids in the RDF are sized such that they form an efficient bridge across the pores of the formation rock as it is being drilled. As the solids in the RDF develop bridges across the exposed pores (pore throats) of the reservoir, the polymeric fluid loss material (i.e. starch) from the RDF is co-deposited within the interstices of the solid bridging particles, thus sealing off the reservoir from the wellbore. Analyses of a family of filtercakes show that the filtercakes comprise roughly 55-61% calcium carbonate, 17-18% polymers, and 16-20% drill solids (which are most often aluminosilicates/clays).

Calcium carbonate (acid-soluble) and polymers (soluble in oxidative or enzyme breakers) are relatively simple to dissolve from the RDF filtercakes. However, the most difficult portion of the filtercake to dissolve remains the insoluble drill solid particulates. There are several services/fluids currently executed to dissolve filtercakes to restore productivity/injectivity between the formation and wellbore. Currently, Schlumberger uses a fluid known as MudSOLV (Trade Mark from Schlumberger), which uses an array of chemicals targeting specifically two of the three components of the water-based RDF filtercake: chelants or acids are used to dissolve the calcite component, enzymes or oxidizers are used to degrade the polymer component.

However, even MudSOLV benefits from a large commercial success and technical advance in the field, major limitation is its failure to dissolve the third component of the water-based RDF filtercake i.e. the drilling solids and clays. By comparison, mud acid is well known to efficiently dissolve aluminosilicate materials. However, mud acid treatments (including in filtercake dissolution) involve a number of stages of functional fluids used in sequence to dissolve the various filtercake components: an acid preflush for calcite dissolution followed by the mud acid (HCl/HF) fluid, which dissolves the clay particulates. However, mud acid is highly reactive and is difficult to inhibit the reaction kinetics thereof. As a result, aggressive mud acid types of treatments have been known to pinhole through a filtercake rapidly, creating massive fluid losses to the formation only through the pinhole (and inefficiently dissolving the remainder of the filtercake).

Some prior arts intended to fix some of the disclosed drawbacks. U.S. Pat. No. 7,134,496 from Jones et al. addresses technology surrounding the methods of use of hydrocarbon-external, acid-internal emulsions to dissolve filtercakes deposited through the use of oil-based muds. The acidizing fluids described herewith include chelating agents generally described as polyaminopolycarboxylic acids. However, the ability to dissolve simultaneously calcite and clays is not described. SPE publications "First Application of Novel Microemulsion Technology for Sand Control Remediation Operations—A Successful Case History From the Rosa Field, a Deepwater Development Project in Angola," from Lavoix et al. and "NAF Filtercake Removal Using Micro-emulsion Technology" from Quintero et al, disclose acid/surfactant/hydrocarbon emulsions used in the dissolution of oil-based filtercakes. However, again, these acidizing fluids lack the ability to dissolve appreciable amounts of aluminosilicate materials (which can be a large portion of the overall filtercake composition). U.S. Pat. No. 6,978,838 from Parlar et al. describes the sequential execution of a solution for polymer dissolution, a high-rate displacement of that fluid (to clean the wellbore), followed by a solution of acid and/or chelating agent to dissolve the calcite portions of the filtercake. However, Parlar et al. describes specifically the use of acids that do not significantly react with siliceous formations.

Therefore, there is a need for the development of an alternative solution first, that is capable of dissolving all three components of a filtercake, secondly that has retarded reaction kinetics (to prevent pinholing), and lastly that minimizes the number of stages of fluid in a mud acid treatment, and in the case of injector wells, minimizes the need to flowback the spent fluid to the surface and ensures that the spent fluid can be squeezed into the formation directly after treatment.

SUMMARY

A technique is proposed herein for the efficient dissolution of filter cake deposited from drilling mud. The current composition comprises a carrier fluid, one or multiple surfactants, a fluorine source and an organic stabilizer able to minimize precipitation of fluorine. The carrier fluid can be water, brine, oil or a combination of water and oil: water-in-oil emulsion or oil-in-water emulsion. As such, this composition is useful in the dissolution of filter cake deposited from either water-based (WBM) or oil-based (OBM) mud.

Advantageously, the fluorine source is a hydrogen fluoride source, as for example hydrofluoric acid, ammonium fluoride, or ammonium bifluoride. The organic stabilizer can be taken in the list constituted of: organic acid, organic chelating agent, or a mixture thereof. When the organic stabilizer is an organic acid, preferably the organic acid has at least two carboxyl groups, more preferably two, three, or four carboxyl groups. The organic acid or organic chelant agent in solution with fluorine would allow for the simultaneous dissolution of calcium carbonate and aluminosilicate drill-solids (such as rev-dust) from filter cake while minimizing the risks of precipitation of fluorine into calcium fluoride or poisoning the growth of calcium fluoride crystals. These organic acids may be present in the formulation in the free-acid, salt-form, or partial salt form. When present as salts, these salts would exist most preferably as the ammonium or partial-ammonium salts. The organic acids or chelating agents may be present singly or in a mixture.

In another embodiment, the composition further comprises an oxidative breaker. The oxidative breaker can be added to dissolve better the polymer solids of the filter cake. Advantageously, the oxidative breaker is coated or encapsulated.

Also, the surfactant when added to the formulation, may allow for diversion of filter cake dissolution fluid of prior art across long treating intervals (through the buildup of resistance in the porosity of higher-permeability zones or zones that experienced early filtercake-breakthrough or "pin-holing").

Still in another embodiment, the surfactant is a viscoelastic surfactant, for example of the type betaine.

In another aspect, a composition for removing filter cake comprising calcium carbonate is disclosed, the composition comprising: an aqueous base, a viscoelastic surfactant, a hydrogen fluoride source and an organic stabilizer able to avoid precipitation of calcium fluoride when the composition is put in contact with the filter cake.

Advantageously, the fluorine source is a hydrogen fluoride source, as for example a hydrofluoric acid or fluoride salt such as ammonium fluoride or ammonium bifluoride (ABF). The organic stabilizer can be taken in the list constituted of: organic acid, organic chelating agent. When the organic stabilizer is an organic acid, preferably the organic acid has two, three or four carboxyl groups. When the fluorine source is a hydrofluoric acid, preferably, the organic stabilizer is an organic acid or chelant such as EDTA, HEDTA, maleic acid, tartaric acid, malic acid, or a salt or partial salt thereof or a mixture thereof.

In another embodiment, the overall fluid pH may be adjusted using an additional acid. The fluid pH may be between around 6 to much lower pH values below 1. The fluid pH may be chosen due to the bottomhole temperature that will be treated. Higher temperatures may necessitate more moderate pH values closer to around 6 in order to retard reaction kinetics; conversely, lower temperatures may necessitate lower pH values to ensure sufficient reactivity toward the components of the filtercake. In the composition of the invention, a Bronsted acid or proton donor is used. The Bronsted acid is any compound having the formula $AH = A^- + H^+$ when added to water. Various acids may be used. These may include HCl, HF, organic acids, sulfamic acid, sulfonic acid, methanesulfonic acid, phosphonic acid, phosphoric acid, an ammonium salt, an ammine salt, a chelate acid and combinations thereof Those Bronsted acids that provide ammonium ions may be particularly useful in many applications. Typically, the Bronsted acid will be present in the composition in an amount of from about 2% to about 20% by weight of the composition. The Bronsted acid may be used in an amount to provide or adjust the composition to the desired pH level.

In another embodiment, the composition further comprises an oxidative breaker. Preferably, the oxidative breaker is taken in the list constituted of: ammonium persulfate, sodium perborate Traditional stages of fluids used for filter-cake cleanup are only capable of calcite dissolution (acetic or hydrochloric acid, for example) or clay dissolution (in the case of mud acid); however, those treatments are carried out in sequential stages of fluid, which is not optimal for these treatments; a simplified solution would have significant benefits compared to the prior fluids used in the field. Additionally, current commercial solutions that claim to be "one-step" methods for removing filtercake particles from wellbores are largely lacking the ability to dissolve the clay/aluminosilicate portion of the filtercake.

Still in another aspect, an improved method of removing filter cake particles from a hydrocarbon reservoir wellbore is disclosed, the method comprising: (i) drilling the wellbore in the hydrocarbon reservoir with a drilling fluid; (ii) forming a filter cake and bridging particles over at least part of the wellbore, wherein the filter cake comprises calcium carbonate; (iii) contacting the filter cake with a composition comprising a carrier fluid, a surfactant, a fluorine source and an organic stabilizer; wherein the organic stabilizer minimizes the precipitation of calcium fluoride or poisoning the growth of calcium fluoride crystals and (iv) allowing filter cake particles to be dissolved by the composition.

The methods can be used when the carrier fluid is aqueous base, as for example water or brine. In this case, the drilling fluid is mostly of the time water-based mud.

Advantageously, when the drilling fluid is oil-based mud, the carrier fluid is water-in-oil emulsion, and the method further comprises the step of contacting the composition with the drilling fluid and/or filter cake resulting in inversion of the emulsion of the carrier fluid into oil-in-water emulsion. Effectively, the surfactant of the composition allows the formation of a microemulsion of the hydrocarbon portion of the filtercake in the case of an OBM; microemulsions are typically nonviscous and as such, should be easy to either squeeze into the formation (in injector wells) or to produce to the surface (in producer wells).

As such, an alternative way to place the composition is to combine the composition when the carrier fluid is aqueous based with a large volume of hydrocarbon forming an oil-external (micro)emulsion stabilized by the surfactant that, when injected downhole reacts with the oil in an OBM-filtercake to invert the emulsion allowing the acid to react with the filtercake components. This provides not only efficient means of cleaning/dissolving all the major components of OBM-filtercakes, but additionally, with the acid in an internal phase during injection, the fluid is largely noncorrosive until the emulsion reverts to acid-external The method can further comprises a step of washing the at least part of the wellbore, by removing the dissolved filter cake particles. Said step can be made by producing the well, the dissolved filter cake particles going to surface or by squeezing into the formation the dissolved filter cake particles.

Advantageously, the method is used with the composition as disclosed previously.

BRIEF DESCRIPTION OF THE DRAWINGS

FIG. 2—Table 3 shows core permeability results before/after treatment for compositions according to the invention.

DETAILED DESCRIPTION

Figure 1:
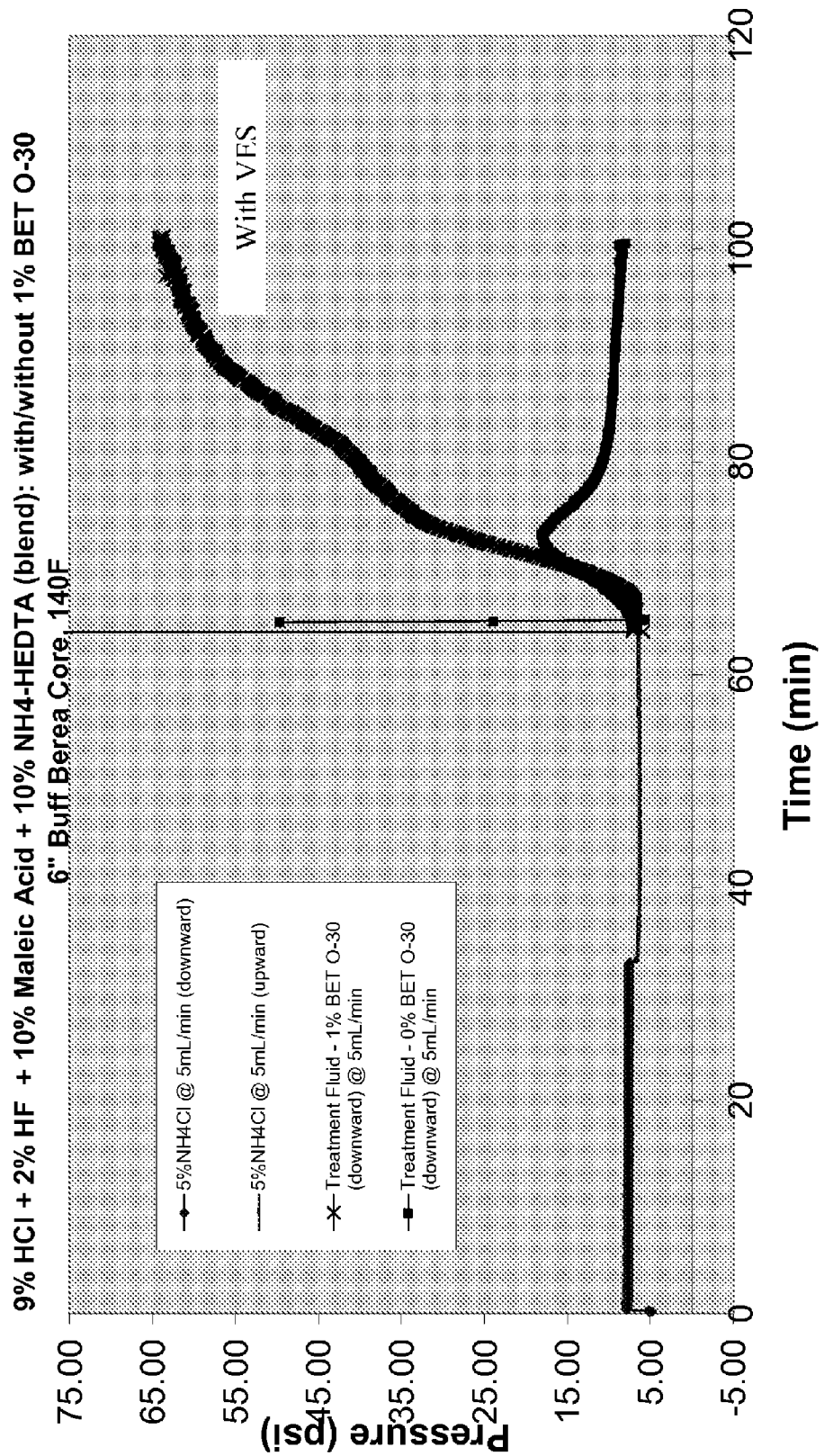
FIG. 1 shows the results of variation of pressure over time for single core testing according to an embodiment of the invention.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The proposed technique pertains to wells that are openhole completions drilled with a drilling fluid that forms filtercake. The drilling fluid can be either water-based or synthetic/oil-based. The drilling fluids used in the pay zone are called drill-in fluids (DIF) or also reservoir drilling fluids (RDF). These fluids contain bridging agents and fluid loss control additives, in addition to viscosifiers, in order to minimize invasion of the pay zone by damaging materials.

As stated, filtercakes may comprise roughly 55-61% calcium carbonate, 17-18% polymers, and 16-20% drill solids (which are most often aluminosilicates/clays). Some embodiments aim to simultaneously dissolve aluminosilicate particles with calcium carbonate while eliminating the risk of precipitation of calcium fluoride. This property is known as "calcium tolerance", a property that most solutions of hydrofluoric acid are not able to exhibit (due to the facile precipitation of calcium fluoride). This family of fluids that exhibits calcium-tolerance includes solutions of hydrofluoric acid with certain selected organic acids. Also a hydrogen fluoride source with certain selected organic acids exhibits calcium-tolerance.

The organic acids may be organic di-, tri- or tetra-carboxylates as for example: maleic acid, tartaric acid, citric acid, and similar. The organic acids may be organic polycarboxylates as for example: homopolymers and copolymers including units of poly(acrylic acid), poly(maleic acid), and similar. The organic acids may include certain commercial chelating agents for example: ethylenediaminetetraacetic acid (EDTA), (2-hydroxyethyl)-ethylenediaminetriacetic acid (HEDTA). These organic acids may be present in the formulation in the free-acid, salt-form, or partial salt form. The organic acids may also be present in the composition as a single organic additive or as a mixture. When present as salts, these salts would exist most preferably as the ammonium or partial-ammonium salts. These fluids are also very useful in the dissolution of filter cakes, whose composition can often include both 55-61% calcium carbonate and 16-20% aluminosilicates/clays. As such, a good mud-filter-cake cleanup treatment is intended to dissolve all of the solid portions of the filtercake that coats the formation in order to optimize the contact between the formation-face and wellbore.

The use of a traditional mud acid (without acidic preflush) would likely lead to the rapid generation of calcium fluoride, which would likely damage the permeability and lead to an inadequate contact between the wellbore and formation. Additionally, the use of an acidic preflush, while effective in the dissolution of the calcite portion, has rapid dissolution kinetics with the calcite portion (leading to pinholing and inefficient soak-time with the entire filtercake) and adds unneeded complexity to the execution of the cleanup treatment. Due to the nonoptimal (rapid) reactions occurring in mud acid fluids and their acidic preflush fluids, a solution of organic acid/chelant/polycarboxylate with hydrofluoric acid (or an HF-source) at a moderate pH (to moderate the dissolution reactions) is preferred at high temperatures to retard the reaction kinetics. Optimally at temperatures over 200° F., solutions of diammonium-EDTA (DAE) with hydrofluoric acid (or hydrogen fluoride source) are effective in the simultaneous dissolution of calcium carbonate and kaolinite (which could serve as a model for the mineral-composition of many of the types of aluminosilicates that could be encountered in a filtercake).

In another embodiment, the overall fluid pH may be adjusted using an additional acid. The fluid pH may be between around 6 to much lower pH values below 1. The fluid pH may be chosen due to the bottomhole temperature that will be treated. Higher temperatures may necessitate more moderate pH values closer to around 6 in order to retard reaction kinetics; conversely, lower temperatures may necessitate lower pH values to ensure sufficient reactivity toward the components of the filtercake. In the composition of the invention, a Bronsted acid or proton donor is used. The Bronsted acid is any compound having the formula $AH=A^-+H^+$ when added to water. Various acids may be used. These may include HCl, HF, organic acids, sulfamic acid, sulfonic acid, methanesulfonic acid, phosphonic acid, phosphoric acid, an ammonium salt, an ammine salt, a chelate acid and combinations thereof Those Bronsted acids that provide ammonium ions may be particularly useful in many applications. Typically, the Bronsted acid will be present in the composition in an amount of from about 2% to about 20% by weight of the composition. The Bronsted acid may be used in an amount to provide or adjust the composition to the desired pH level.

Inclusion of viscoelastic surfactants (VES) into acidizing solutions enables the fluid to be diverted between sandstone cores of dissimilar initial mineralogy. Preferably, the viscoelastic surfactant is a betaine surfactant (such as erucic amidopropyl dimethyl betaine and oleoylamidopropyl dimethyl betaine). In this case, the acidizing fluid used is preferably a solution of maleic acid/HF and/or DAE/HF.

This ability to divert flow between varied permeabilities through surfactant inclusion would be useful in filtercake cleanup as well, as typically the zones that are treated with current cleanup-formulations are typically long-intervals. Additionally, if a cleanup fluid rapidly dissolves the components in certain select areas (through the formation of pinholes), large volumes of the fluid can be lost into the formation and therefore have inadequate exposure to the remainder of the filtercake, leading to improper cake cleanup. If pinholes were formed in the proposed family of fluids, the addition of a VES would generate temporary resistance to flow in the permeability of the formation in the location of pinholes, therefore limiting the fluid-losses to the formation and allowing for longer shut-in times (to better dissolve the entire filter-cake). However, the solution of surfactant in an aqueous (water, brine) carrier fluid has an added benefit in the treatment of filter cakes formed through the use of oil-based muds; OBM-cakes are often coated in large amounts of organic material, limiting the ability of any acid fluid to contact the majority of the filtercake. The addition of certain families of surfactants would contact the hydrocarbon, form small oil-internal vesicles (in the form of a nonviscous "microemulsion" or "nanoemulsion", depending on the vesicle dimensions), thereby removing the hydrocarbon portion and allowing for adequate acid-filtercake exposure.

Additionally, in order to dissolve in a more efficient manner the polymer portion in the filtercake (often over 17% of the filtercake composition), oxidative "breaker" additives can be included in the fluid formulation of the invention. Oxidative breakers include compounds such as ammonium persulfate, sodium perborate, and a multitude of other. These breakers have varied reactivity toward polysaccharide polymers (the polymeric portion of a filtercake) at different pH-values. Therefore, the pH of the organic-acid/HF/breaker fluid (and the relative concentrations of those components) would need to be optimized to allow for the preferred rate of dissolution of the clay/calcite portions as well as the polymeric portions of the mud-cake. Additionally, these breaker additives added to the fluid may be encapsulated or otherwise coated in a way to protect the active breaker from immediate release into the composition. The breaker release from these protected-breaker materials may occur through crushing, leaching, or otherwise slow release into solution.

In another embodiment, the composite aqueous filtercake-dissolving fluid can also be mixed with a volume of hydrocarbon, forming an oil-external (micro)emulsion stabilized by the surfactant. When injected downhole, the fluid would interact with the oil components of the OBM-filtercake to invert the emulsion (now, acid-external) allowing the acid to react with the filtercake components. This provides not only efficient means of cleaning/dissolving all three major components of OBM-filtercakes, but additionally, with the acid in an internal phase during injection, the fluid is largely noncorrosive until the emulsion reverts to acid-external. Due to the inherent risks of corrosion of tubulars and pumping equipment using acidic fluids (specifically acids containing HF), this non-corrosive emulsion of HF-fluid would have much lower corrosion risk.

According to a method, the treatment application will be carried out with injection of the filtercake cleanup fluid into the wellbore to contact the filtercake, followed by a slow dissolution time (hours) of the filtercake components during fluid-shut-in to allow the removal of the downhole equipment to the surface. After the shut-in, the fluid could be either squeezed deeper into the formation (in injector wells) or produced to the surface (in producer wells).

EXAMPLES

Example 1

Slurry reactor tests were conducted on mineral solids composed of 70 g kaolin. The minerals were crushed in a plastic bag, and then ground to a fine powder using a mortar and pestle. These mineral samples were then treated using a slurry reactor, available from Parr Instrument Company, Moline, Ill., which includes a 4500 series Parr pressure reactor with a capacity of 1 L of fluid. In each test, the fluid in the reactor was stirred at 100 rpm using a 4 bladed impeller driven by a magnetic drive-coupled electric motor. The cell was fitted with a 4" dip tube to enable the acquisition of samples on a timed basis. The cell was also fitted with a backpressure regulator, which was set at 1380 kPa (200 psi). The reactor cell and internal parts were constructed of Hastelloy B. The solid mineral was placed into a Teflon cup which was fitted to the inside of the reactor cell. The cell was then sealed and heated to the desired reaction temperature. Separately, the treatment fluid solution was pumped into an accumulator housing and was heated separately to the desired temperature. When both chambers were at the test temperature, the test fluid was transferred to the chamber containing the stirred clay (at 100 rpm) and the test time was started. The tests were typically carried out for 4 hours. Fluid samples were collected at targeted intervals throughout the experiment, were filtered through 0.2 μm filters, and were diluted with deionized water for ICP analysis. The concentrations of dissolved aluminum and silicon resulting from efficient clay/aluminosilicate dissolution were measured in each of those samples using a Perkin-Elmer Optima 2000 DV inductively coupled plasma (ICP) optical emission spectrometry instrument (results are summarized on Table 1. The residual solids at the end of the experiment were rinsed, filtered, and analyzed using a Rigaku Miniflex X-ray Diffractometer (XRD). The compositions of treatment fluids samples (500 mL by volume for each) that were used are summarized in table 1.

High concentrations of dissolved aluminum and silicon are indicative of efficient clay/aluminosilicate dissolution. So, better dissolution is realized with samples C1, D1 or E1 compared to A1 or B1. However, the mild-pH fluids in A1 and B1 are quite effective in aluminosilicate dissolution at higher temperatures, such as above 90 degC.

TABLE 1

Comparative study of dissolution results

| Sample | Fluids [500 mL each] | pH (fin) | Temp [deg C.] | [Al]-peak (ppm) | [Si]-peak (ppm) |
|---|---|---|---|---|---|
| A1 | 50% Diammonium EDTA solution (45% blend) + 1% ABF | 5.19 | 60 | 3180 | 1520 |
| B1 | 50% Diammonium EDTA solution (45% blend) + 1% ABF | 5.56 | 80 | 9880 | 919 |
| C1 | 9% HCl + 1.5% ABF + 5% oxalic acid | 1.79 | 60 | 12000 | 2330 |
| D1 | 9% HCl + 1.5% ABF + 5% oxalic acid | 0.34 | 80 | 15800 | 1860 |
| E1 | 9% HCl + 1.5% ABF + 5% oxalic acid | 0.36 | 100 | 9600 | 2050 |

Example 2

Same protocol is used as for example 1. However, in example 2, slurry reactor tests were conducted on mineral solids composed of 35 grams each of kaolinite and calcium carbonate. Fluid samples were collected at targeted intervals throughout the experiment, were filtered through 0.2 μm filters, and were diluted with deionized water for ICP analysis. The concentrations of dissolved aluminum, silicon and calcium resulting from efficient clay/aluminosilicate dissolution as well as efficient calcium carbonate-dissolution were measured in each of those samples. The compositions of treatment fluids samples (500 mL by volume for each) that were used are summarized in table 1.

High concentrations of dissolved aluminum, silicon and calcium are indicative of efficient clay/aluminosilicate dissolution. Further, simultaneous high concentrations of calcium, aluminum, and silicon with no reduction (over time) in the concentration of dissolved calcium is indicative of equivalent dissolution of calcium carbonate and clays with reduced precipitation. So, better dissolution is realized with samples C2, D2 compared to A2, B2, E2 or F2. Additionally, XRD analysis of the residual solids after reaction was used to qualitatively estimate the occurrence of calcium fluoride precipitate. Therefore, fluids C2, D2, E2, and F2 show the lack of calcium fluoride in the residual solids, as imparted by the addition of organic acids.

TABLE 2

Comparative study of dissolution results

| Sample | Fluids [500 mL each] | pH (fin) | Temp [deg C.] | [Al]-peak (ppm) | [Si]-peak (ppm) | [Ca]-peak (ppm) | Presence of Calcium Fluoride (Y/N) |
|---|---|---|---|---|---|---|---|
| A2 | 9% HCl + 1.5% ABF [9/1 mud acid] | 0.19 | 60 | 10300 | 1680 | 29400 | Yes |
| B2 | 9% HCl + 1.5% ABF [9/1 mud acid] | 0.46 | 80 | 8670 | 1820 | 25600 | Yes |
| C2 | 9% HCl + 1.5% ABF [9/1 mud acid] + 5% oxalic acid | 0.52 | 80 | 11900 | 3030 | 25800 | No |
| D2 | 9% HCl + 1.5% ABF [9/1 mud acid] + 5% oxalic acid | 0.51 | 100 | 11500 | 3140 | 23600 | No |
| E2 | 9% HCl + 1.5% ABF [9/1 mud acid] + 10% (NH4)HEDTA solution (roughly 40% pure) | 0.77 | 60 | 6450 | 1570 | 22100 | No |
| F2 | 9% HCl + 1.5% ABF [9/1 mud acid] + 10% (NH4)HEDTA solution (roughly 40% pure) | 0.39 | 80 | 6360 | 1390 | 22500 | No |

Example 3

FIG. 1 shows the results of variation of pressure over time for single core testing using identical lots of cores. Differential pressure generation is indicative of the ability to divert (from this core to zones of lower initial permeability). Incorporation of 1% VES leads to significant higher differential pressure (temporary damage) generation than that of a fluid lacking it.

Table 3 summarizes core permeability before/after treatment for three samples (A3 and B3 were plotted on FIG. 1). In each test, 5% ammonium chloride was used to determine core permeability before/after treatment. The columns include flow rate (Q, for brine and treatment fluid stages), initial and final permeability in production direction (k-ini and k-fin), Differential pressure during steady-state brine (DP (ini)), Differential pressure (DP-max) at peak pressure during treatment phase, DDP=difference in differential pressure between brine & Treatment phases, peak aluminum and calcium (Al-peak, Ca-peak) in effluent during treatment phase (from ICP), and if there was a shut-in after the treatment phase or not.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A method of removing filter cake particles from a hydrocarbon reservoir wellbore comprising:
   (i) drilling the wellbore in the hydrocarbon reservoir with a drilling fluid;
   (ii) forming a filter cake which is bridging particles over at least part of the wellbore, wherein the filter cake comprises calcium carbonate;
   (iii) contacting the filter cake with a composition comprising a carrier fluid, a surfactant, a fluorine source and an organic stabilizer; wherein the organic stabilizer minimizes precipitation of calcium fluoride; and
   (iv) allowing the filter cake particles to be dissolved by the composition.

2. The method of claim 1, wherein the carrier fluid is an aqueous base.

3. The method of claim 1, wherein the drilling fluid is an oil-based mud and the carrier fluid is a water-in-oil emulsion, the method further comprising the step of contacting the composition with the drilling fluid and/or filter cake resulting in inversion of the emulsion of the carrier fluid into an oil-in-water emulsion.

4. The method of claim 1, further comprising a step of washing the at least part of the wellbore, by removing the dissolved filter cake particles.

5. The method of claim 1, wherein the fluorine source is a hydrofluoric acid.

6. The method of claim 1, wherein the composition further comprises an oxidative breaker.

7. The method of claim 1, further comprising an oxidative breaker that is coated or encapsulated.

8. The method of claim 1, wherein the surfactant is a viscoelastic surfactant.

9. The method of claim 1, wherein the organic stabilizer is taken in the list constituted of: ethylenediaminetetraacetic acid (EDTA), (2-hydroxyethyl)-ethylenediaminetriacetic acid (HEDTA), maleic acid, tartaric acid, malic acid, diammonium ethylenediaminetetraacetic acid (DAE), and any mixtures thereof.

10. The method of claim 1, wherein the organic stabilizer is a salt or partial salt of component taken in the list constituted of: ethylenediaminetetraacetic acid (EDTA), (2-hydroxyethyl)-ethylenediaminetriacetic acid (HEDTA), maleic acid, tartaric acid, malic acid, diammomium ethylenediaminetetraacetic acid (DAE), and any mixtures thereof.

* * * * *